(12) United States Patent
Yang

(10) Patent No.: US 7,365,644 B2
(45) Date of Patent: Apr. 29, 2008

(54) METHOD AND DEVICE FOR WIRELESS MONITORING OF SYSTEM STATUS

(75) Inventor: Tzu-Yi Yang, Taipei (TW)

(73) Assignee: Inventec Corporation, Taipei (TW)

( * ) Notice: Subject to any disclaimer, the term of this patent is extended or adjusted under 35 U.S.C. 154(b) by 237 days.

(21) Appl. No.: 11/246,087

(22) Filed: Oct. 11, 2005

(65) Prior Publication Data
US 2007/0080803 A1 Apr. 12, 2007

(51) Int. Cl.
*G08B 13/14* (2006.01)
(52) U.S. Cl. .............. 340/572.1; 340/539.1; 714/25; 714/48; 235/437
(58) Field of Classification Search ......... 340/572.1, 340/539.1, 593.11, 10.1, 10.32, 10.34, 10.5; 714/25, 48; 702/58; 235/376, 437, 739
See application file for complete search history.

(56) References Cited

U.S. PATENT DOCUMENTS

| | | | |
|---|---|---|---|
| 6,415,392 B1 * | 7/2002 | Suzuki et al. ............ | 714/27 |
| 6,462,654 B1 * | 10/2002 | Sandelman et al. ........ | 340/506 |
| 6,745,257 B2 * | 6/2004 | Gallo et al. ............... | 710/19 |
| 7,230,520 B2 * | 6/2007 | Zaretsky et al. .......... | 340/10.1 |

* cited by examiner

*Primary Examiner*—Toan N. Pham
(74) *Attorney, Agent, or Firm*—Birch, Stewart, Kolasch & Birch, LLP

(57) ABSTRACT

A method and device for wireless monitoring of system status is provided. The method employs a radio frequency identification (RFID) transponder and a RFID reader for transmission of system status. When the system monitoring program executed in the computer device detects abnormality, it would generate a system status code and send it to the RFID transponder, where the status code is combined with an ID code into a packet and sent out by wireless devices. The RFID reader integrated in an electronic device is used to receive the packet, make reference to the reference table embedded in the electronic device to determine the specific message represented by the system status code, and finally display the ID code and the corresponding status message.

3 Claims, 5 Drawing Sheets

METHOD AND DEVICE FOR WIRELESS MONITORING OF SYSTEM STATUS

BACKGROUND OF THE INVENTION

1. Field of the Invention

The present invention relates to a method and device for wireless monitoring of system status, more particularly a method and device for wireless monitoring of system status applied to notebook computers, desktop computers and servers.

2. Descriptions of the Related Art

The advancement of information technology has made computer an indispensable part of people's life. In particular the connection of server with the Internet makes global communication and contact possible. To allow system users to access the Internet and exchange information at anytime, system administrator must keep the Internet connection open 24 hours a day, and engage in troubleshooting immediately or turn on the backup system when problem arises.

Practically all businesses nowadays use server, which may be a web server, mail server, FTP server or printer server, and many companies might have dozens or even hundreds of servers in their computer room. The dynamic management of system status of those servers is apparently becoming an important task.

For server makers, every finished server must be subjected to system testing. But if the system operation status of each and every server is manually observed, it will be a highly inefficient operation that consumes tremendous manpower resources and is prone to human errors.

Rather mature system monitoring technologies that allow automatic detection of the operating status of computer system are now available on the market. Some monitoring technologies even allow system optimization based on the parameters obtained in the monitoring process, but many statuses of the computer system still cannot be automatically adjusted to the ideal state. It relies on the publication of real-time status so the administrator can proceed with troubleshooting. The system monitoring operation provides another important and valuable function. That is, it allows the system administrator to gather data on the abnormal statuses of an information system, subject those data to statistical analysis, and take preventive actions based on the results.

SUMMARY OF THE INVENTION

To address the drawback of prior art, the object of the present invention is to use a radio frequency identification (RFID) transponder and a RFID reader to transmit the system status of a computer device. When the system monitoring program executed in the computer device detects abnormality, it would generate a system status code, which is transmitted by the RFID transponder and received by the RFID reader, and then sent on a real-time basis to an electronic device used by the administrator. Through the real-time reading of such electronic device, the administrator is able to dynamically grasp the status of all computer systems and instantly deal with the problem.

To achieve the aforementioned object, the present invention provides a method and device for wireless monitoring of system status, which use a RFID transponder integrated in a computer device and a RFID reader integrated in an electronic device for transmission of system status, and includes the steps of: creating a reference table of system status codes and complete status messages in an electronic device; installing a RFID transponder in a computer device; executing a system monitoring program in the computer device, which generates a system status code when the computer device has abnormality; transmitting the system status code to the RFID transponder and combining it with an identification (ID) code into a packet, and sending the packet by wireless devices; using the RFID reader in the electronic device to receive the packet; recording the ID code and making reference to the reference table to decode the specific message represented by the system status code; and displaying the ID code and the complete message of corresponding system status code.

To implement the aforesaid method, the present invention further provides a RFID transponder, consisting of a controller for telecommunication and connection with a computer device; and an inductor chip to receive the system status code output by the controller and transfer the system status code after it is combined with an ID code through its antenna.

The implementation of the present invention is able to achieve the following effects:

1. Wired connection is not required for system status monitoring.
2. The complete message of system status code is rapidly and conveniently displayed without referring to technical manual, making the display of error code explicit and highly efficient.
3. It allows simultaneous monitoring of a plurality of computer devices, thereby enhancing the production or management efficiency.
4. The electronic device used is a commonly available Information Technology (IT) device. Thus the present invention does not require the fabrication of additional hardware, rendering it both economical and practical.

The objects, features and functions of the present invention are illustrated further with examples and accompany drawings.

DETAILED DESCRIPTION OF THE INVENTION

Figure 1:
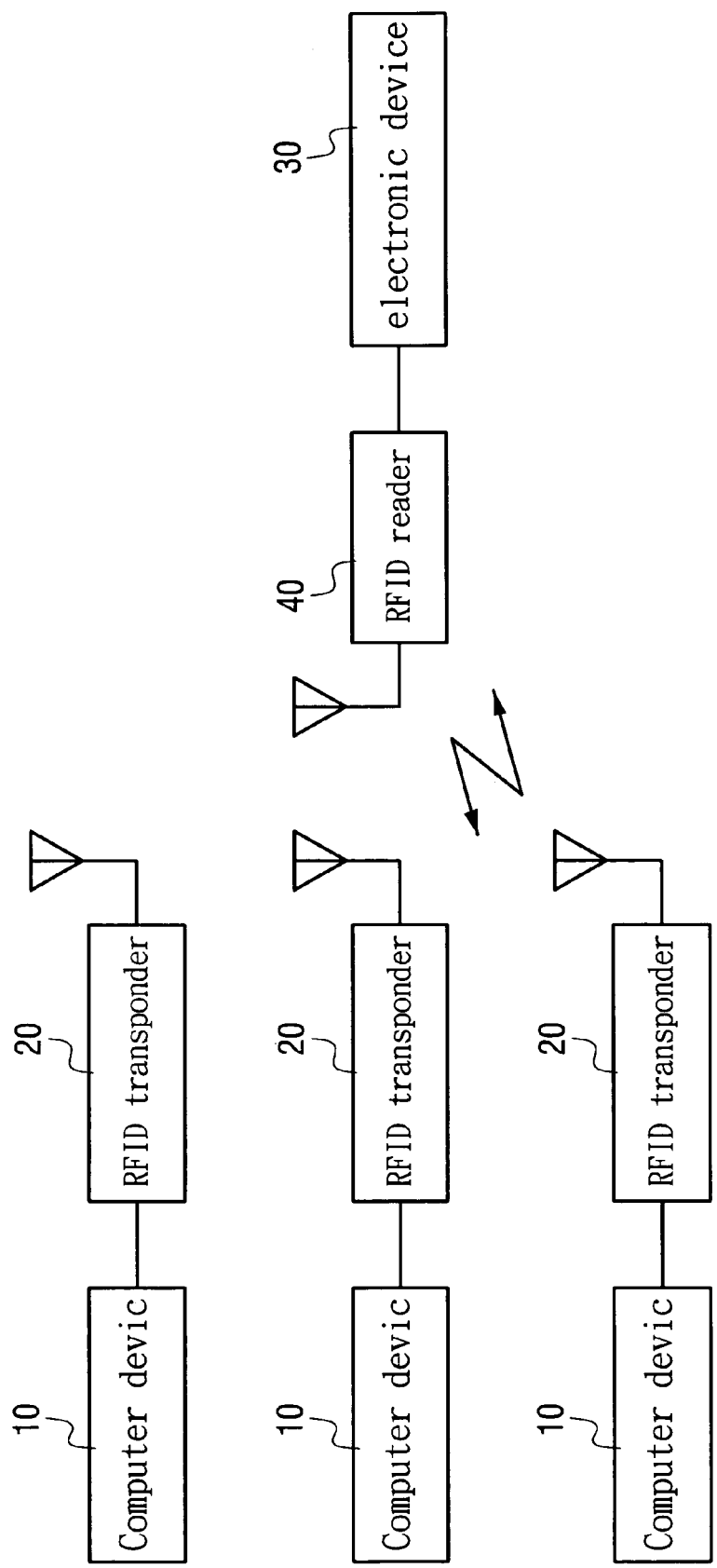
FIG. 1 is a diagram showing an application of the invention.

As shown in FIG. 1 which shows an application of the invention, the RFID transponder (20) of the RFID wireless transmission system is built inside each computer device (10, 11, 12 . . . ) or electrically and signally connected to each computer device (10, 11, 12 . . . ) as an external component. The RFID reader (40) of the RFID wireless transmission system is built inside the electronic device (30) or electrically and signally connected to the electronic device (30) as an external component. Both the computer devices (10, 11, 12 . . . ) and the electronic device (30) are situated within the receivable range of signals from the RFID wireless transmission system, or the electronic device (30) is portable to allow system administrator to carry it around and interact with more computer devices (10, 11, 12 . . . ).

Figure 2:
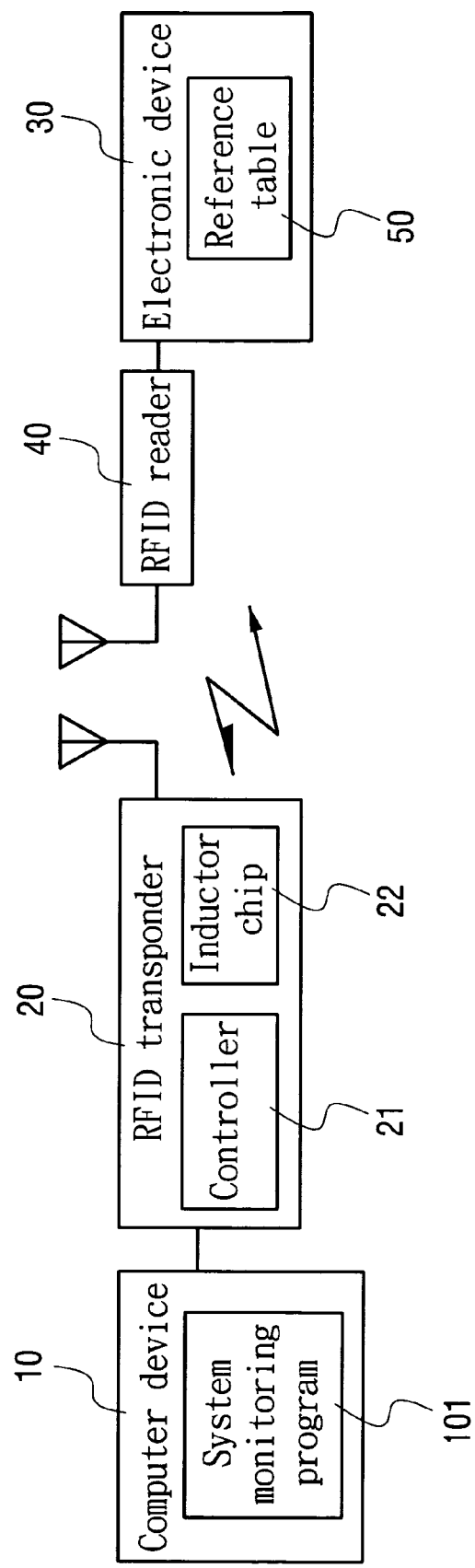
FIG. 2 is a diagram showing the hardware configuration of the computer device and electronic device of the invention.

FIG. 2 shows an example of the hardware configuration of the computer devices (10, 11, 12 . . . ) and electronic device (30) of the invention, in which only one computer device (10) and one electronic device (30) are illustrated, but the computer devices (11, 12 . . . ) in FIG. 1 have the same basic configuration as that (10) in FIG. 2. Those computer devices (10, 11, 12 . . . ) are a desktop computer, a server, or a notebook computer, while the electronic device (30) may be a desktop computer, a server, a notebook computer, or a personal digital assistant (PDA).

Figure 3:
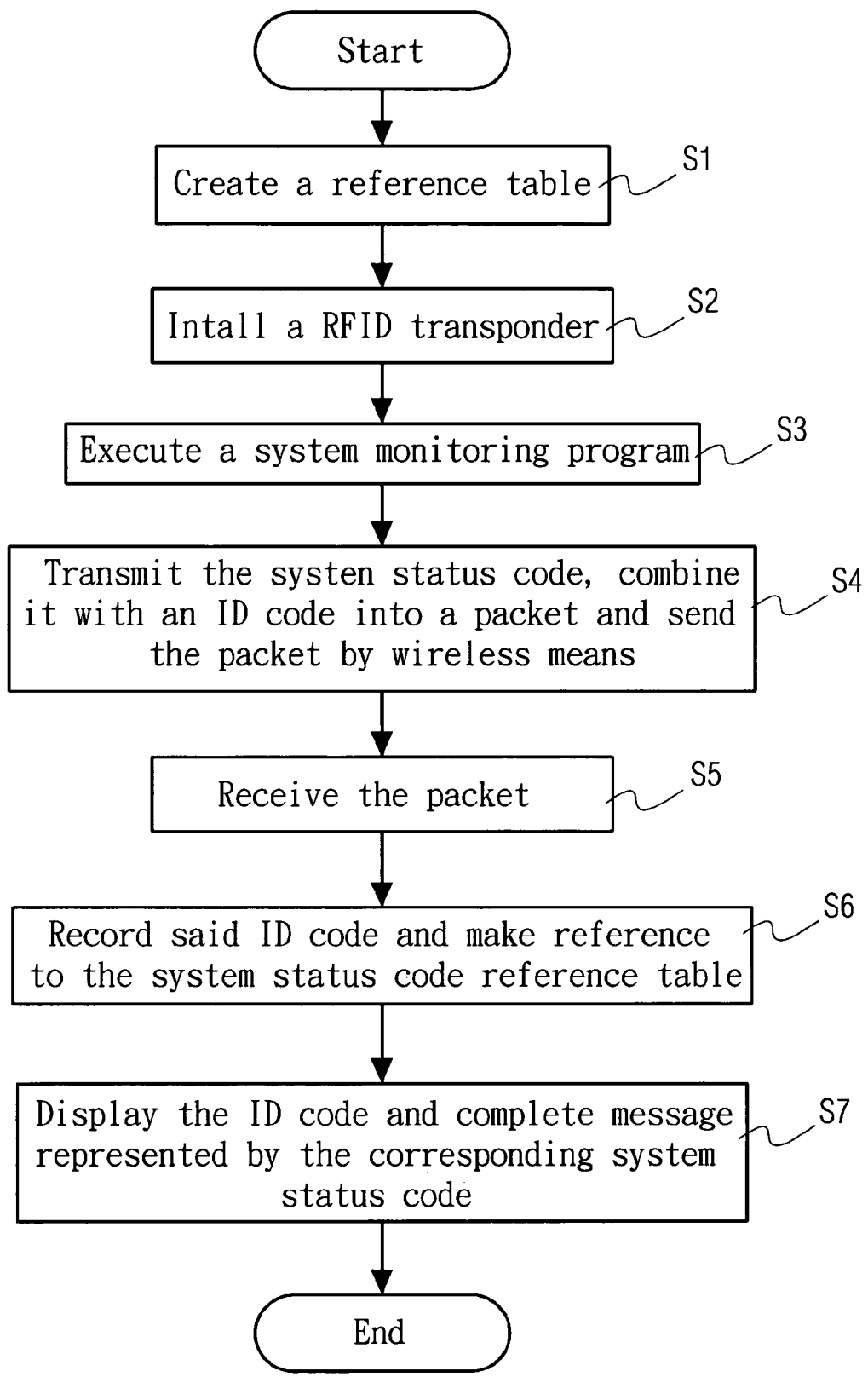
FIG. 3 shows the flow chart of a method for wireless monitoring of system status according to the invention.

FIG. 3 shows the flow chart of a method for wireless monitoring of system status according to the invention. The present invention uses a RFID transponder (20) which is integrated in computer devices (10, 11, 12 . . . ) and a RFID reader (40) which is integrated in an electronic device (30) to transmit the system status, and includes the steps of: creating a reference table of system status codes and complete status messages in the electronic device (step 1); installing a RFID transponder in the computer device (step 2); executing a system monitoring program in the computer device, which generates a system status code when the computer device has abnormality (step 3); transmitting the system status code to the RFID transponder and combining it with an ID code into a packet, and sending the packet by wireless means (step 4); using the RFID reader in the electronic device to receive the packet (step 5); recording the ID code and making reference to the reference table to decode the specific message represented by the system status code (step 6); and displaying the ID code and the complete message of corresponding system status code (step 7).

Figure 4:
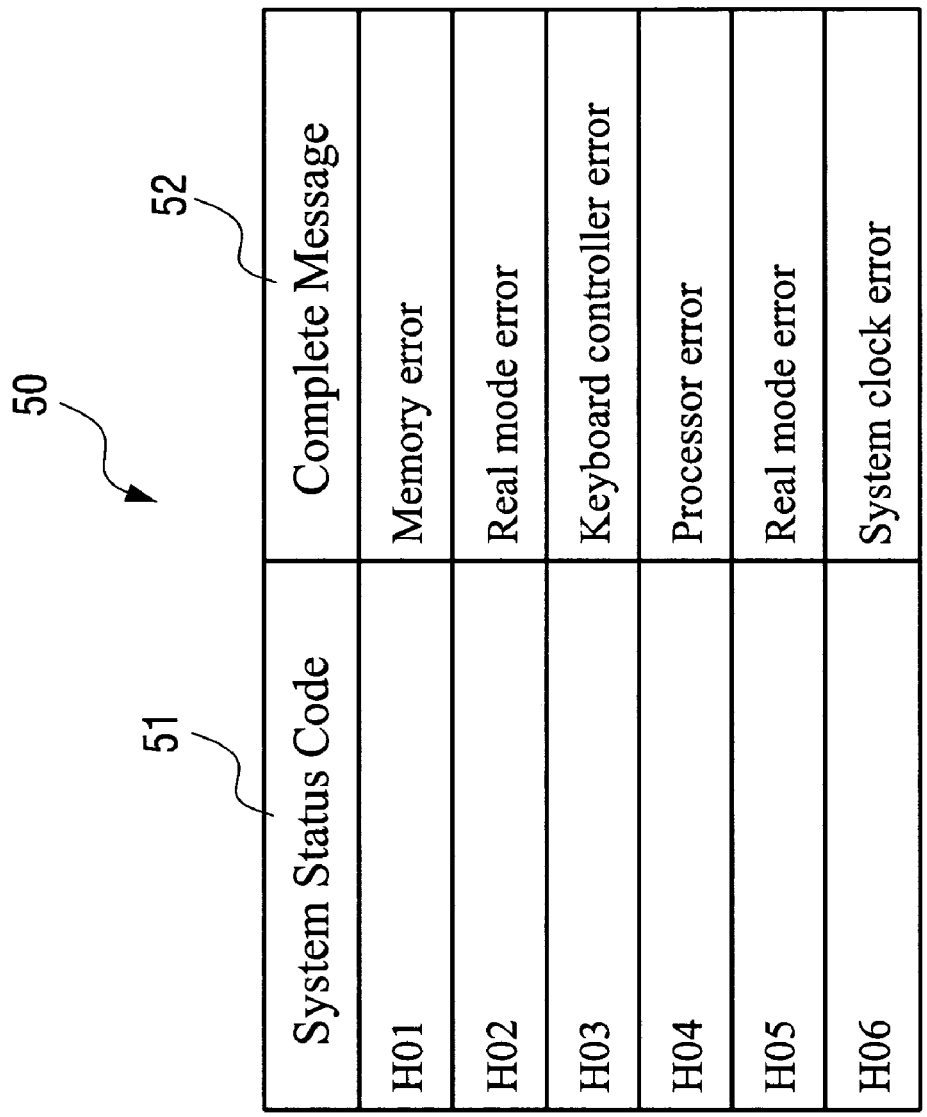
FIG. 4 shows an example of a reference table of system status codes and complete status messages embedded the electronic device.

For the monitoring system to operate, a reference table (50) must be first created in the electronic device (30). An example of the reference table (50) is illustrated in FIG. 4, which includes system status codes (51) and complete corresponding messages (52). With the RFID transponder (20) installed in computer devices (10, 11, 12 . . . ), when the system monitoring program (101) running in the computer devices (10, 11, 12 . . . ) detects abnormality, it would generate a system status code (51) corresponding to the abnormal condition, which is sent to RFID transponder (20) and combined with a ID code preset in the RFID transponder (20) into a packet. The RFID transponder (20) then transmits the packet containing ID code and system status code (51) by wireless means to the electronic device (30).

When the RFID reader (40) in the electronic device (30) receives the packet sent by RFID transponder (20), the electronic device (30) would record the ID code and check the corresponding system status code. (51) The electronic device (30) then makes reference to the embedded reference table (50) containing system status codes (51) and complete corresponding status messages (52) to determine the specific message (52) represented by the system status code (51), and finally display the complete corresponding status message (52) together with the original ID code to let the administrator know clearly what kind of problem happens to which computer device (10, 11, 12 . . . ) and carry out troubleshooting.

Figure 5:
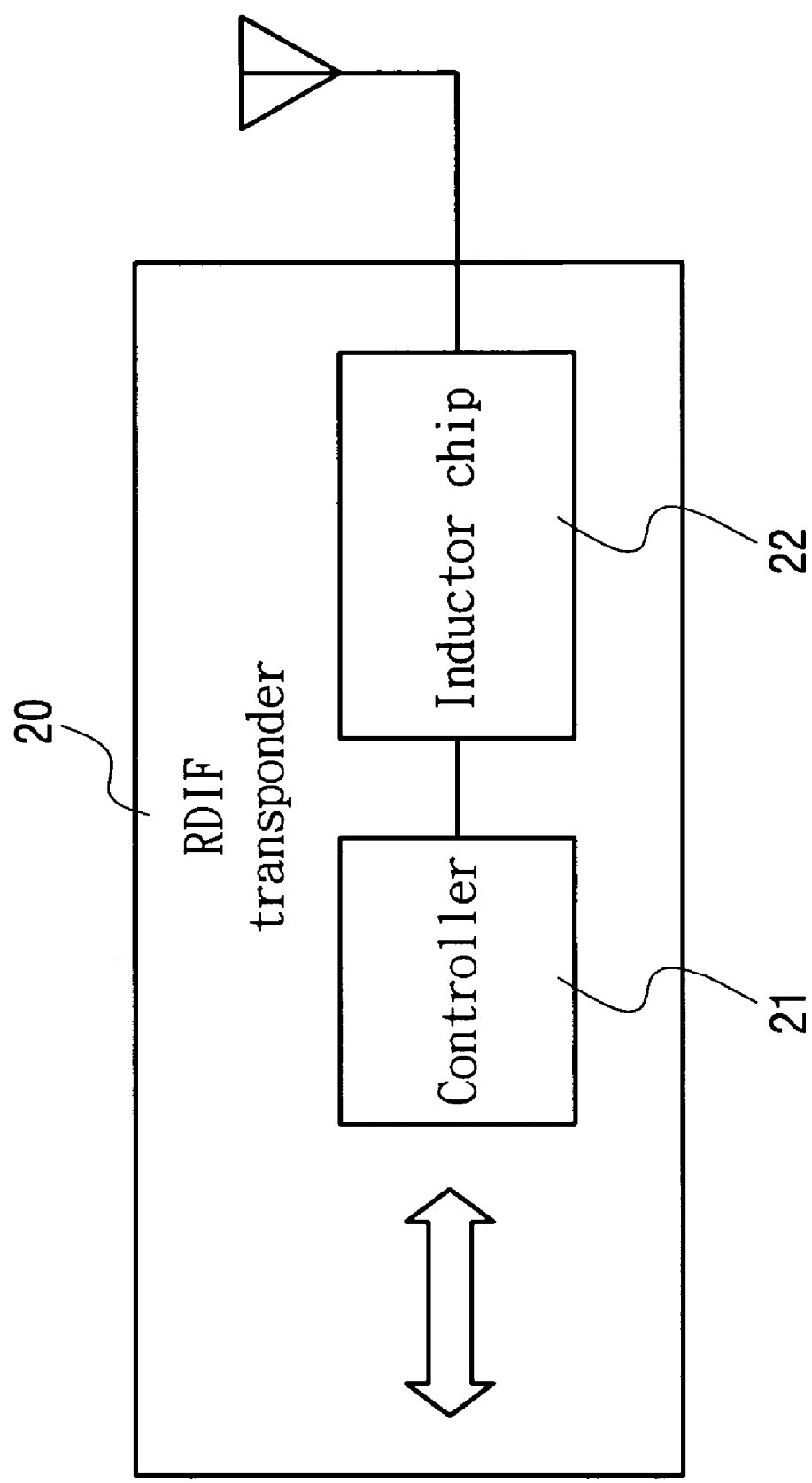
FIG. 5 is an example of the RFID transponder according to the invention.

As shown in FIG. 5, an example of the RFID transponder (20) of the invention consists of: a controller (21) for signal communication and electrical connection with a computer device (10, 11, 12 . . . ); and a inductor chip (22) to receive the system status code (51) output by the controller (21), combine the system status code (51) with the ID code in the inductor chip (22), and transfer the codes through the attached antenna. The controller (21) is a USB, or an IEEE 1394, or a RS232 port controller (21) or a bus controller (21) for receiving system status codes (51) from the computer device (10, 11, 12 . . . ). Because the RFID transponder (20) can obtain power supply from the computer device (10, 11, 12 . . . ) via the controller (21) interface, it can actively combine the system status code (51) and the ID code in the inductor chip (22) into a packet and send it out.

The description above is merely a preferred embodiment of the invention which should not be construed as a limitation on the scope of claim. All modifications and alterations to the descriptions without departing from the spirits of the invention shall remain within the protected scope and claims of the invention.

What is claimed is:

1. A method for wireless monitoring of system status, characterized in which a radio frequency identification (RFID) transponder integrated in a computer device and a RFID reader integrated in an electronic device are used for transmission of system status, comprising the steps of:

creating a reference table of system status codes and complete status messages in the electronic device;

installing a RFID transponder in the computer device;

executing a system monitoring program in the computer device and generating a system status code when the computer device has abnormality;

sending the system status code to the RFJD transponder, combining the status code with an identification (ID) code into a packet, and sending the packet by wireless means;

receiving the packet with the RFID reader in the electronic device;

recording the ID code and making reference to the reference table to identify the specific status message represented by the system status code; and displaying the ID code and the complete status message represented by the corresponding system status code.

2. The method according to claim 1, wherein the computer device comprises a desktop computer, a server, and a notebook computer.

3. The method according to claim 1, wherein the electronic device comprises a desktop computer, a server, a notebook computer, and a personal digital assistant.

* * * * *